United States Patent
Gill

[15] 3,660,983
[45] May 9, 1972

[54] APPARATUS AND METHOD FOR THE PREVENTION OF ICE IN WATERWAYS

[72] Inventor: George W. Gill, Wesher Villa, Apt. # 71, Webster, Tex. 77598

[22] Filed: Sept. 24, 1969

[21] Appl. No.: 860,536

[52] U.S. Cl.................................61/1, 61/30, 61/36,
[51] Int. Cl.................................E02b 3/00, E02b 5/04, E02b/15/02
[58] Field of Search................61/1, 12, 34, 30, 36, 36 A, 61/46; 62/260

[56] References Cited

UNITED STATES PATENTS

| 907,441 | 12/1908 | Baur | 61/36 |
| 3,083,538 | 4/1963 | Gross | 61/1 |
| 3,318,098 | 5/1967 | Hoddinott et al. | 61/1 |
| 1,495,105 | 5/1924 | Stromberg | 61/36 |
| 3,380,255 | 4/1968 | Schroeder | 61/34 |

Primary Examiner—Jacob Shapiro
Attorney—Bernard A. Reiter

[57] ABSTRACT

The apparatus and method for enclosing bodies of water and for treating said water with chemical agents in order to lower the freezing point thereof and thus maintain the body of water free of ice so as to permit the movement of ships therethrough. The apparatus consists of a plurality of dams constructed of ice extending in such manner as to form a waterway. The dams of ice confine the chemically treated water and restrict escape of the treated water due to natural currents. Gate means are provided within the dam structure so as to provide for the ingress and egress of ships.

8 Claims, 4 Drawing Figures

3,660,983

George W. Gill
INVENTOR

BY  Bernard A. Reiter

ATTORNEY 3,660,983

APPARATUS AND METHOD FOR THE PREVENTION OF ICE IN WATERWAYS

BACKGROUND OF THE INVENTION

The present invention pertains to the apparatus and method for maintaining the navigability of a body of water which resides in a naturally occurring freezing environment. More specifically this invention pertains to a system of dam structures constructed from ice and arranged between adjacent masses of land so as to enclose a body of water which is intended to act as a waterway. Similarly the invention herein may be used to simply mark a body of water.

For centuries man has been prevented from navigating the waters of the polar regions and near polar regions and other areas of the world because of the naturally occurring freezing environment which creates a layer of ice on the water that is sometimes 2 or more feet thick. Numerous and varied ideas have been conceived by man in his efforts to reduce, if not eliminate, this crust of ice which frequently is an obstacle not only to exploration but to commercial and industrial growth. Examples of man's endeavors in this direction may be viewed in U.S. Pat. Nos. 3,318,098 and 3,083,538 wherein each discloses a structure for inhibiting surface ice in order to enhance navigation of waterways. The primary problems and disadvantages characterizing these well intentioned conceptions are first: their excessive cost to manufacture and install, and second: their limited applicability in use, namely that they may function only in relatively small areas and over narrow expanses of water, and thirdly: their requirements for substantial and powerful ancillary operating equipment.

Recently there has been discovered on the North Shore of Alaska substantial deposits of petroleum. Extensive investigation and elaborate drilling operations are being planned and initiated by some of the largest petroleum companies in the world in an effort to remove and market this petroleum. The marketing program inherently requires the transportation of this petroleum from the North Shore to depositories for refining and processing. This may be accomplished either by long distance pipeline or by utilization of large ocean-going tankers. The latter transportation method is most desirable because of the lower cost involved. In utilizing ocean-going tankers, however, there is incurred the aforementioned problem pertaining to surface ice. Over large expanses of open water the removal and/or prevention of surface ice is a relatively difficult if not impossible task. However, the northern regions of Canada from west to east are characterized by literally hundreds of islands disposed between relatively larger masses of land. It is through this region that the transportation of the Alaskan petroleum reserves is expected to occur and it therefore becomes desirable and necessary to provide an apparatus and method for creating and maintaining an extended navigable waterway.

SUMMARY OF THE INVENTION

The present invention therefore is directed to an apparatus and method which is uniquely adapted to the successful fulfillment of the objectives described hereinabove. In so doing, it obviates all of the problems characterized by prior art attempts to maintain navigable waterways in freezing environments. Specifically this invention provides for an apparatus and a method which effectively precludes the formation of ice in discrete areas of water in a most inexpensive and unique manner. This is accomplished by the creation of ice dams which are submerged between bodies of land. The ice dams are produced from the naturally occurring water. When a body of water has been enclosed by the dams it is treated with a chemical solution intended to lower the freezing point thereof. The ice enclosing the treated water is protected from the solution by plastic jackets mechanically attached to the ice surface. The dams thus function to retain the treated water from being removed by naturally occurring currents. Openings are provided in the dam in the form of movable doors so that ships may enter and leave at appropriate points. Treatment of the water may be accomplished by utilization of naturally occurring local deposits of sodium chloride (NaCl) or the like. It is thus seen that by utilizing naturally occurring materials there is provided herein a unique and relatively inexpensive method and apparatus for insuring the transportation over and navigation through normally frozen waterways thus permitting substantial reduction in transportation costs and enhancing commercial and economic growth for many areas of the world.

Numerous other features and advantages of the present invention will become readily apparent upon a careful reading and examination of the following detailed description, claims and drawings wherein like numerals denote like parts in the several views and wherein:

Figure 1:
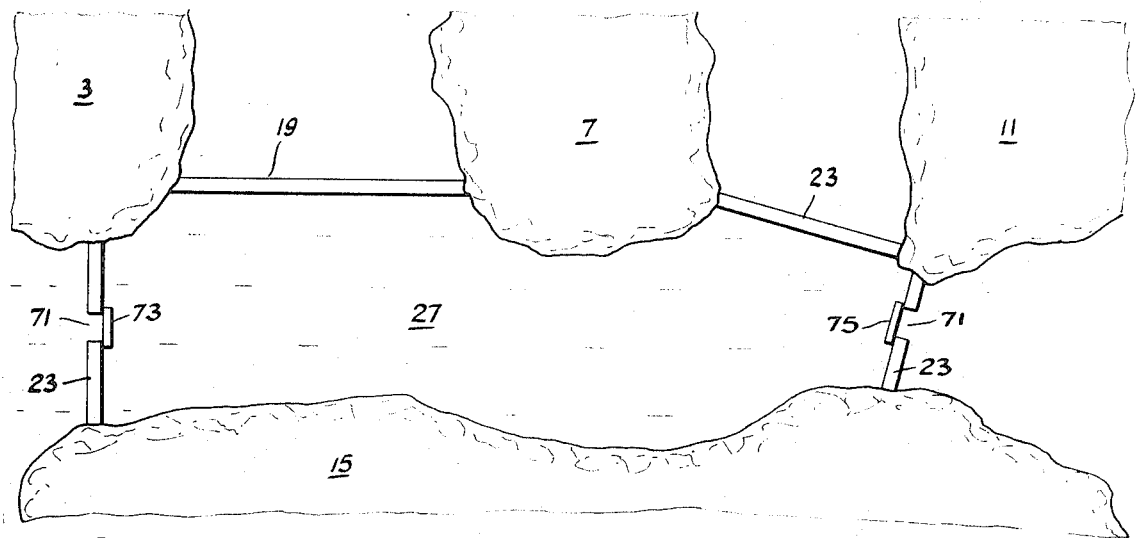
FIG. 1 is a topographic representation of the present invention.

With reference now to the drawing there is shown an exemplary geographical arrangement such as may be present in an area characterized by a multitude of relatively proximate islands and/or land masses. The islands, generally designated 3, 7 and 11 reside at a given distance from either another island or land mass 15. The islands may be at varying distances with respect to one another or to any adjacent land mass. It is not necessary that a land mass be present to constitute an enclosure by way of the artifically created walls or dams 19, 23. The walls or dams 19, 23 are comprised basically of ice, created from the naturally occurring sea water of the environment and frozen by the naturally occurring temperature thereat. The ice dams are constructed by erecting wooden or other appropriate forms on the surface of an area of ice, the forms being arranged and erected so as to provide a mold-like receptacle. Into the receptacle or mold there is then pumped through a spray hose or other appropriate device the water which is under and adjacent to the ice. This water is sprayed on at a rate consistent with the temperature of the environment so as to provide a continuously increasing height of ice. The relative width of the form into which the water is sprayed and its relative length may be varied in accordance with the size of ice upon which the mold is situated since it is the intention of the method to place additional weight upon such ice thereby causing it to sink at a rate consistent with the freezing process. After the water freezes, the mold is removed and replaced at a higher level or simply raised to a higher level so that the spraying and freezing cycle can be repeated thus causing, over a period of time, additional weight to be placed upon the surface and resulting in a continued submergence of the ice mass to a lower depth. The entire process is repeated until the ice, which is in the form of an elongate rectangle, descends to the floor beneath the water. In this manner, dam sections may be constructed such as at 19 and 23 between islands and/or land masses and/or other dam sections so as to enclose or delineate a body of water 27 which is to be subsequently treated to prevent the formation of ice therein.

Figure 2:
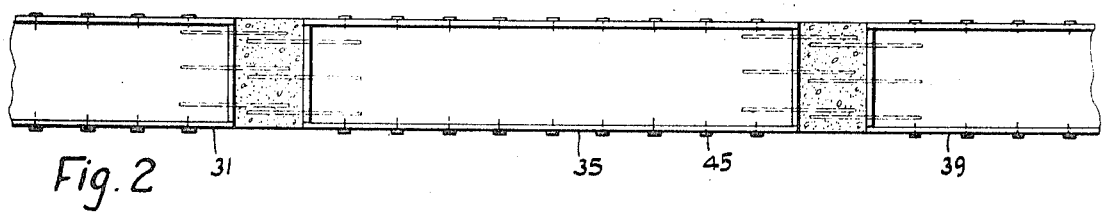
FIG. 2 is a top view in detail showing the dam construction illustrated in FIG. 1.
Figure 3:
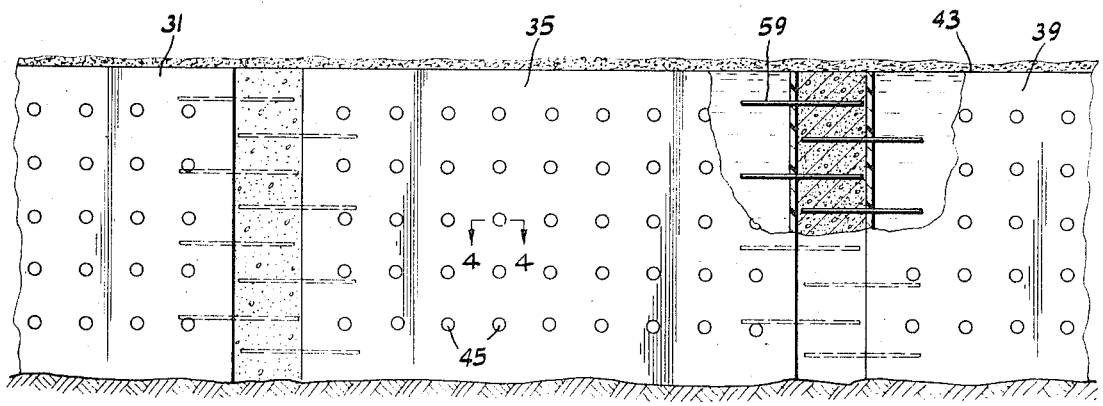
FIG. 3 is a front view in detail showing the dam construction in FIG. 1.

Prior to the treatment of the enclosed water 27 it becomes necessary to protect the surface of the ice dams 19, 23 from the chemicals which are to be injected in the water. Since these chemicals prevent the formation of ice they will obviously create a deterioration in the surface of the ice dams unless the latter are protected. In pursuance of this it is intended that the surface of the ice dams should be covered with an appropriate insulating material such as rigid urethane foam sheets 31, 35, and 39 (see FIG. 2). Materials other than rigid urethane foam sheets may be used. For example, styrofoam sheets, polyethylene sheeting, polyvinyl chloride sheeting or other flexible or semi-rigid plastic sheets or foams could also be constructed over the sides of the ice dams 19, 23. These insulative sheets could be applied to the ice either during or after the construction of the ice dam. As shown in FIG. 3 the protective sheet 39 extends from the surface 43 of the ice dam to the floor upon which the ice dam rests. The same is true of the sheets 35 which protect the ends of the ice dam.

Figure 4:
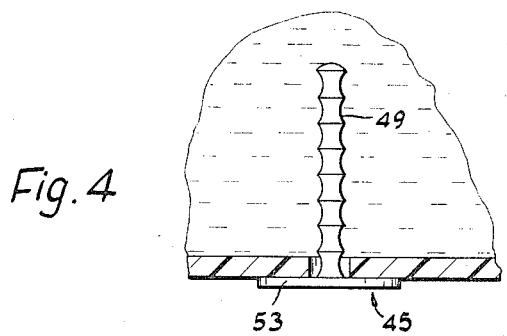
FIG. 4 illustrates an exemplary form of one of the restraining patches in FIGS. 2 and 3.

Attachment of the protective sheets 31, 35, and 39 is accomplished by the use of appropriate means such as for example the restraining patch 45 shown in FIG. 4. The restraining patch 45 consists of an ice nail or ice screw 49 to which is attached, either separately or integrally, an expanded pressure head 53 the purpose of which is to bear against the wall of the ice dam and thereby hold the protective sheeting to the sides thereof. Preferably the restraining patch 45 is of molded one piece construction and may be made of polyethylene, polypropylene, nylon, urethane rubber, silicone rubber, or other material which is resistant to salt, chemical erosion, and freezing temperatures.

In constructing the ice dam of the invention it may frequently be desirable to produce the ice blocks in sections having exemplary dimensions of 300 feet long, 50 feet wide and of sufficient depth to rest upon the floor beneath the water. The ice dam sections may, during the process of construction, have inserted therein a plurality of appropriately spaced and positioned reinforcing members 59. The reinforcing members are, as shown in FIG. 3, disposed in offset relationship to one another as they protrude from adjacent ice dam blocks. This is done in order to enhance the structural connection between the blocks. Such structural connection may likewise be accomplished in a variety of ways. For example the void between the blocks could be filled with concrete or other cementitious material which is resistant to the natural elements of the environment. This is done after the blocks are in resting position on the floor adjacent to one another in reasonably proximate relationship. At that time the concrete may be poured into the void between the ice blocks and held therein by the appropriate positioning of a retaining wall which is pressed against the front and back surfaces of the ice blocks at the areas defined by the voids between the blocks.

Appropriately located in specified ice dam sections 23 are ingress and egress areas 71. These areas permit the navigation of ships into and through the treated water while at the same time maintaining the integrity of the treated water with respect to the untreated water exteriorly of the dam system. The ingress-egress areas are closed off by a gate system 73, 75. The gates may be hydraulically and/or mechanically operated in accordance with well known principles so as to permit ships to enter and/or leave the treated waterway. Each of the gates may be weighted slightly heavier than the water they displace so as to be easily movable by the machinery which is operatively associated therewith. In operation, construction of the ice dam system herein is commenced in early winter, when air temperatures are generally below the freezing point of water and there exists approximately 2 to 3 feet of pack ice over the water. At the pre-selected site of the dam, linear sections of appropriate dimensions are constructed with rigid polyurethane foam in suitable forms. Water from below the ice is then pumped up and into these forms, where due to the atmospheric temperatures freezing occurs. The process is repeated and the forms are built higher to such a predetermined point where, by calculation there is sufficient weight to almost break the 2 or 3 feet of basal ice. The ice is then broken linearly by a plurality of small explosive charges or other means thus causing the constructed ice to sink. Continued building of ice on top of each ice dam subsequently sinks it farther until the bottom or floor is reached. Each segment or section of the dam is thus constructed independently and individually with respect to other adjacent sections. The water enclosed by the dam system may be treated with appropriate materials such as sodium chloride as previously mentioned, this material being available in many areas in naturally occurring salt domes from which the salt can be leached by means of a hot water plant located in an operational vicinity. In addition and/or in the alternative, chemicals may be dispersed in the waterway by distribution from a ship or airplane or other means. Upon completion of the treatment of the water the gates will remain closed except when a vessel is moving into or out of the treated waterway.

While this invention has been shown and described with reference to a dam structure, it is to be understood that numerous different applications of the apparatus and method are possible. For example, it could be used for water and channel markers and the like without departing from the spirit and scope hereof.

That which is claimed and desired to be secured by United States Letters Patent is:

1. The method of producing ice in a body of water in order to denote a discrete water area which may be readily recognized by an observer thereat comprising the steps of erecting a form on a base of ice spraying water into the form while in a freezing environment so as to cause solidification of the water into a layer of ice separating the form from the ice layer, separating the base ice and layer ice thereon from the surrounding base ice, repetitively and consecutively rebuilding the form on the floating ice, spraying water into the form in said freezing environment, allowing the water to freeze, and separating the form from the ice so as to thereby produce a first mass of ice of progressive vertical dimension in the water.

2. The method of claim 1 wherein said form is of generally rectangular configuration in planar view so as to form the elongate mass of ice in which the vertical dimension extends into the depth of the body of water constructing additional masses of ice similar to the first and adjacent thereto and, positioning said additional masses of ice in side by side relation so as to form a substantially linear structure of ice across the water.

3. The method of claim 1 wherein the repetitive and consecutive steps of spraying, freezing and releasing the mold are continued until the ice mass contacts the floor beneath the water so as to thereby firmly found the ice mass in position and constructing and founding additional ice masses so as to form an enclosed body of water either with said additional masses of ice or with adjacent masses of land.

4. The method of claim 3 wherein insulation means are positioned and affixed to the wall surfaces of said masses of ice so as to protect the ice from deteriorating constituents in the water adjacent thereto.

5. The method of claim 4, including the additional step of treating the water enclosed by the masses of ice with an ice inhibitor so as to reduce the freezing temperature thereof.

6. The method of claim 5 wherein there is included the step of covering the top surface of the ice masses with dirt or other insulating material so as to protect the surface thereof from heat.

7. The method of claim 2 including the additional step of constructing and founding additional ice masses in adjacent relation to said first ice mass so as to thereby produce a solid structure in the water.

8. The method of claim 1 wherein said first mass of ice is built so as to rest upon the floor beneath the surface of the water and thereby create a reference object at the surface.

* * * * *